United States Patent
Hickmott et al.

(10) Patent No.: US 11,667,266 B1
(45) Date of Patent: Jun. 6, 2023

(54) WINDSHIELD WIPER WITH SPRAY MECHANISM

(71) Applicants: Christopher R. Hickmott, Lake Havasu City, AZ (US); Steven Kimmins, Lake Havasu City, AZ (US)

(72) Inventors: Christopher R. Hickmott, Lake Havasu City, AZ (US); Steven Kimmins, Lake Havasu City, AZ (US)

( * ) Notice: Subject to any disclaimer, the term of this patent is extended or adjusted under 35 U.S.C. 154(b) by 422 days.

(21) Appl. No.: 16/918,258

(22) Filed: Jul. 1, 2020

(51) Int. Cl.
*B60S 1/52* (2006.01)
*B60S 1/48* (2006.01)
*B60S 1/38* (2006.01)

(52) U.S. Cl.
CPC ............ *B60S 1/524* (2013.01); *B60S 1/38* (2013.01); *B60S 1/483* (2013.01)

(58) Field of Classification Search
CPC ............ B60S 1/483; B60S 1/38; B60S 1/524
USPC ...................................... 15/250.001
See application file for complete search history.

(56) References Cited

U.S. PATENT DOCUMENTS

| | | | |
|---|---|---|---|
| 5,327,613 A | 7/1994 | Ohtsu | |
| 5,839,153 A | 11/1998 | Ahn | |
| 6,804,855 B2 | 10/2004 | Lebel | |
| 8,511,582 B2 | 8/2013 | Renke et al. | |
| 8,621,705 B1 | 1/2014 | Valeanu | |
| 8,832,900 B2 | 9/2014 | Kaminga et al. | |
| 9,387,831 B2 | 7/2016 | Hartman | |
| 2016/0114767 A1* | 4/2016 | Al Salameh | B60S 1/524 239/284.1 |

FOREIGN PATENT DOCUMENTS

| | | | | | |
|---|---|---|---|---|---|
| EP | 1857338 A1 | * | 11/2007 | ............ | B60S 1/482 |
| FR | 2813259 A1 | * | 3/2002 | ............ | B60S 1/483 |
| GB | 2121681 A | * | 1/1984 | ............ | B60S 1/488 |

OTHER PUBLICATIONS

Hypersonic Universal Car Windshield Washer Sprayer 2Pcs Vehicle Nozzle. Product Listing [online]. © 1996-2020, Amazon.com, Inc. [retrieved on Dec. 31, 2019]. Retrieved from the Internet: <URL: https://www.amazon.com/Hypersonic-Universal-Windshield-Sprayer-Vehicle/dp/B00MB7EXW6/ref=sr_1_1?keywords=hypersonic+windshield&qid=1577391355&s=automotive&sr=1-1>.
Trico 11-100 Spray Universal Windshield Washer Pump-Pack of 1. Product Listing [online], © 1996-2020, Amazon.com, Inc. [retrieved on Dec. 31, 2019], Retrieved from the Internet: <URL: https://www.amazon.com/Trico-11-100-Universal-Windshield-Pump-Pack/dp/B000CB69ZW>.

* cited by examiner

*Primary Examiner* — Katina N. Henson
(74) *Attorney, Agent, or Firm* — Cramer Patent & Design, PLLC; Aaron R. Cramer

(57) ABSTRACT

A windshield wiper has a high-pressure fluid pump in hydraulic communication with a plurality of spray nozzles disposed upon a manifold. The manifold is configured to be mounted on an upper edge of at least one (1) windshield wiper. The fluid pump is in electrical communication with a switch which is disposed on a dashboard of a vehicle upon which the spray mechanism is installed.

15 Claims, 4 Drawing Sheets

WINDSHIELD WIPER WITH SPRAY MECHANISM

RELATED APPLICATIONS

None.

FIELD OF THE INVENTION

The presently disclosed subject matter is directed to a windshield wiper and more specifically to a windshield wiper having a spray mechanism.

BACKGROUND OF THE INVENTION

Maintaining a clean automobile windshield is a necessary step in ensuring driving safety. While common windshield wipers do a good job with rain and snow, stubborn windshield debris, such as splattered bugs, bird droppings, ice, frost, tree sap and the like, generally require manual scrubbing with a nylon type scrubbing pad.

While this is not generally too much of a burden during regular driving, those that drive at dusk during the summer months are often forced to stop at gas stations to rid their windshields of bugs. This is not only an inconvenience, but a safety factor as well, since bugs will immediately begin to accumulate again, once driving resumes. Accordingly, a need has arisen for a means by which motorists can maintain a windshield free from bugs, bird droppings and similar matter without manually scrubbing the windshield. The development of the windshield wiper with spray mechanism fulfills this need.

SUMMARY OF THE INVENTION

The principles of the present invention provide for a clip-on spray rig which comprises one or more fluid sprayers which are detachably coupled to a pair of windshield wipers of a windshield of a vehicle. Each of the one or more fluid sprayers include a manifold and a plurality of clips. The one or more fluid sprayers are supplied with a fluid pumped under pressure from the fluid supply assembly via a plurality of tubing. The clip-on spray rig also comprises a fluid supply assembly which has a mounting bracket, a fluid tank, a motor pump assembly, and a wireless receiver. The fluid supply assembly is mounted under a hood of the vehicle and pumps the fluid out of the fluid tank through the tubing and to the one or more fluid sprayers when the pump within the fluid supply assembly is activated. The fluid tank includes a fill aperture and a drain coupler.

The clip on rig also comprises a wireless transmitter which originates the wireless signal that is sent to the wireless receiver in order to pump the fluid. The wireless transmitter includes a pump control and the wireless transmitter transmit the wireless signal when the pump control is activated and cease transmitting the wireless signal when the pump control is deactivated. The manifold is a hollow tube that routes the fluid from a spray coupler to a plurality of nozzles.

A pump within the fluid supply assembly may be activated and the fluid may be sprayed onto the windshield of the vehicle The pump may be activated by a user from within the vehicle using the wireless transmitter. The manifold may be coupled to each of the windshield wipers such that the nozzles may be oriented to point towards the windshield. The manifold may be coupled to a wiper superstructure of each of the windshield wipers via the clips. The clips may detachably couple to the wiper superstructure of each of the windshield wipers. The clips may be made of a semi-rigid material that flexes open to couple to the manifold and then spring close to retain a grip. Each of the clips may include a tube coupler and a wiper coupler. The tube coupler may be a "C"-shaped armature located at a top end of each of the clips such that the tube coupler detachably couples to the manifold.

The tube coupler may grip the manifold and orient the manifold to point the nozzles. One of the outlet couplers may be unused. The individual outlet coupler may be covered to prevent loss of the fluid from the individual outlet coupler when not in use. The fluid stored in the fluid tank of the fluid supply assembly may be different from that of a windshield washer fluid reservoir of the vehicle. The tubing may couple the drain coupler to an intake coupler of the pump to transport the fluid from the fluid tank to the pump. The fluid pumped from the fluid tank may contain a solution which may be selected from the group consisting of a deicer, a bug solvent, a detergent, or any combination thereof. The fluid from the fluid supply assembly may be delivered through the one or more fluid sprayers at a higher pressure compared to the fluid pumped from a stationary nozzle of the windshield washer that is built into the vehicle.

The mounting bracket may be a base for holding the fluid tank, the pump and the wireless receiver and may include a plurality of mounting apertures for coupling the mounting bracket to the vehicle. The motor pump assembly may include a motor and the pump within a single enclosure. The wireless receiver may energize the motor in the motor pump assembly when the wireless receiver receives a wireless signal to deenergize the motor in the absence of the wireless signal. The mounting bracket may couple to the firewall and supports the fluid tank, the motor pump assembly, and the wireless receiver. The fluid supply assembly may be mounted within the vehicle while the individual fluid sprayer may be coupled to the individual windshield wiper.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
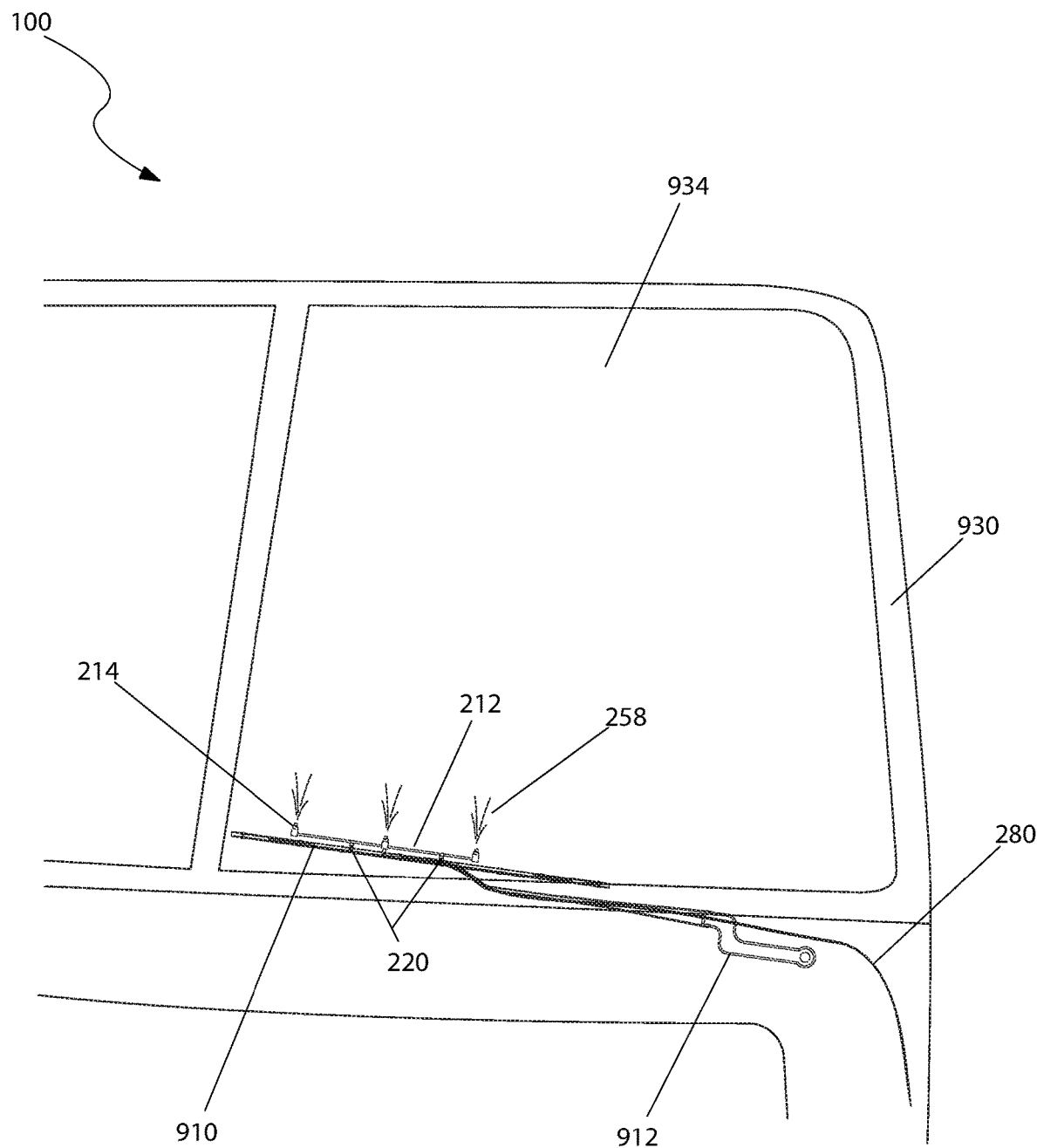
FIG. 1 is an in-use view of a clip-on spray rig for a windshield wiper, according to an embodiment of the present invention.

100 clip-on spray rig
210 individual fluid sprayer 212 manifold
214 nozzle
216 spray coupler
220 plurality of clips
222 individual clip
224 tube coupler
226 wiper coupler
230 fluid supply assembly
232 mounting bracket
234 mounting aperture
240 fluid tank
242 fill aperture
244 cap
246 drain coupler
250 motor pump assembly
258 fluid
262 intake coupler
264 outlet coupler
268 wireless receiver
270 wireless transmitter
272 pump control
274 wireless signal
280 tubing
910 individual windshield wiper
912 wiper arm
922 wiper superstructure
930 vehicle
934 windshield
944 windshield washer fluid reservoir
946 firewall 1. Description of the Invention The present invention is directed to a clip-on spray rig for windshield wipers (herein described as the "invention") 100. The invention 100 may comprise one (1) or more fluid sprayers, a fluid supply assembly 230, and a wireless transmitter 270. The one (1) or more fluid sprayers may detachably couple to windshield wipers of a vehicle 930. The one (1) or more fluid sprayers may be supplied with fluid 258 pumped under pressure from the fluid supply assembly 230 via tubing 280 when a pump within the fluid supply assembly 230 is activated. The pump may be adapted to be activated by a user from within the vehicle 930 using the wireless transmitter 270. The fluid 258 may be sprayed onto a windshield 934 of the vehicle 930. Because the one (1) or more fluid sprayers may move with the windshield wipers the one (1) or more fluid sprayers may cover more of the windshield 934 with the fluid 258 than a windshield washer build into the vehicle 930 alone. Additionally, the fluid 258 stored in a fluid tank 240 of the fluid supply assembly 230 may be different from that of a windshield washer fluid reservoir 944 of the vehicle 930. As non-limiting examples, the fluid 258 pumped from the fluid tank 240 may contain a deicer, a bug solvent, a detergent, or combinations thereof. Finally, the fluid 258 from the fluid supply assembly 230 may be delivered through the one (1) or more fluid sprayers at a higher pressure compared to the fluid 258 pumped from a stationary nozzle of the windshield washer that is built into the vehicle 930.

An individual fluid sprayer 210 selected from the one or more fluid sprayers may clip onto an individual windshield wiper 910. The individual fluid sprayer 210 may comprise a manifold 212 and a plurality of clips 220. The manifold 212 may be a hollow tube that routes the fluid 258 from a spray coupler 216 to a plurality of nozzles 214. The manifold 212 may be coupled to the individual windshield wiper 910 such that the plurality of nozzles 214 are oriented to point towards the windshield 934 and the spray coupler 216 is adjacent a wiper arm 912 of the individual windshield wiper 910. In some embodiments, the manifold 212 may be bent to conform to the shape of a wiper superstructure 922.

When the manifold 212 is charged with pressurized fluid via the spray coupler 216, the fluid 258 may spray from the plurality of nozzles 214 onto the windshield 934. As the manifold 212 is carried back and forth by the motion of the individual windshield wiper 910, the manifold 212 may spray a substantial portion of the windshield 934.

The manifold 212 may be held in place on the individual windshield wiper 910 by the plurality of clips 220. The plurality of clips 220 may detachably couple to the wiper superstructure 922 of the individual windshield wiper 910. An individual clip 222 may be made of a semi-rigid material that may flex open to couple to the manifold 212 or to the individual windshield wiper 910 and may then spring closed to retain a grip.

The individual clip 222 may comprise a tube coupler 224 and a wiper coupler 226. As a non-limiting example, the tube coupler 224 may be a "C"-shaped armature located at the top end of the individual clip 222 such that the tube coupler 224 may detachably couple to the manifold 212. The wiper coupler 226 may comprise the bottom of the individual clip 222 and may detachably couple to the wiper superstructure 922 of the individual windshield wiper 910. The shape of the wiper coupler 226 may vary according to the specific profile of the individual windshield wiper 910.

The fluid supply assembly 230 may comprise a mounting bracket 232, the fluid tank 240, a motor pump assembly 250, and a wireless receiver 268. The fluid supply assembly 230 may be mounted under a hood of the vehicle 930. The fluid supply assembly 230 may pump the fluid 258 out of the fluid tank 240, through the tubing 280, and to the one (1) or more fluid sprayers when the pump within the fluid supply assembly 230 is activated.

The mounting bracket 232 may be a base for holding the fluid tank 240, the pump and the wireless receiver 268. The mounting bracket 232 may comprise two (2) or more mounting apertures 234 for coupling the mounting bracket 232 to the vehicle 930. As a non-limiting example, the mounting bracket 232 may be mounted to a firewall 946 by passing bolts through the two (2) or more mounting apertures 234. The fluid supply assembly 230 may be mounted at other locations on the vehicle 930. As a non-limiting example, the fluid supply assembly 230 may be mounted inside of a trunk if the tubing 280 and electrical wiring are run to the trunk.

The fluid tank 240 may be a container for holding the fluid 258. In some embodiments, the fluid tank 240 may have a length of approximately ten inches (10.0+/−1.0 in.), a width of approximately ten inches (10.0+/−1.0 in.), and a height of approximately six inches (6.0+/−1.0 in.). In some embodiments, the fluid tank 240 may have a capacity of approximately two-point-fifty-nine gallons (2.59+/−0.4 Gal).

The fluid tank 240 may comprise a fill aperture 242 and a drain coupler 246. The fill aperture 242 may open on the top of the fluid tank 240 to refill the fluid tank 240. The fill aperture 242 may be covered by a cap 244 when not refilling the fluid tank 240. The drain coupler 246 may be located at the bottom of the fluid tank 240. The tubing 280 may couple the drain coupler 246 to an intake coupler 262 of the pump to transport the fluid 258 from the fluid tank 240 to the pump.

The motor pump assembly 250 may comprise a motor and the pump within a single enclosure. The motor may convert electrical energy into mechanical energy. The motor may cause rotation of the pump when electrical energy is applied to the motor. The electrical energy applied to the motor may be controlled by the wireless receiver 268. The pump may move the fluid 258 from the intake coupler 262 to one (1) or more outlet couplers 264. As non-limiting examples, the pump may move the fluid 258 by applying rotary motion, reciprocating motion, linear motion, or a combination thereof to one or more gears, screws, pistons, shuttle blocks, vanes, diaphragms, plungers, chains, ropes, impellers, or combinations thereof.

The tubing 280 may couple the one (1) or more outlet couplers 264 on the pump to the spray couplers 216 on the one (1) or more fluid sprayers. If an individual outlet coupler selected from the one (1) or more outlet couplers 264 is unused, the individual outlet coupler may be covered to prevent loss of the fluid 258 from the individual outlet coupler.

The wireless receiver 268 may energize the motor in the motor pump assembly 250 when the wireless receiver 268 receives a wireless signal 274. The wireless receiver 268 may deenergize the motor in the absence of the wireless signal 274. The wireless receiver 268 may be wired to the motor pump assembly 250 and to an electrical system of the vehicle 930.

The wireless transmitter 270 may originate the wireless signal 274 that is sent to the wireless receiver 268 in order to pump the fluid 258. The wireless transmitter 270 may comprise a pump control 272. The wireless transmitter 270 may transmit the wireless signal 274 when the pump control 272 is activated. The wireless transmitter 270 may cease transmitting the wireless signal 274 when the pump control 272 is deactivated. As a non-limiting example, the wireless transmitter 270 may transmit the wireless signal 274 when the pump control 272 is pressed and may cease transmitting the wireless signal 274 when the pump control 272 is released.

In some embodiments, the wireless transmitter 270 may be packaged for mounting on an interior panel of the vehicle 930 and may be powered by the electrical system of the vehicle 930. As a non-limiting example, the pump control 272 may be presented on a dashboard of the vehicle 930. In some embodiments, the wireless transmitter 270 may be packaged as a key fob. The key fob may be powered by a battery.

Referring to FIG. 1, the invention 100 is shown coupled to the individual windshield wiper 910. The manifold 212 may be coupled to the individual windshield wiper 910 via the plurality of clips 220. The plurality of nozzles 214 may point towards the windshield 934 of the vehicle 930. As the wiper arm 912 moves the individual windshield wiper 910 across the windshield 934, the fluid 258 delivered via the tubing 280 may be sprayed over a wide area of the windshield 934.

Figure 2:
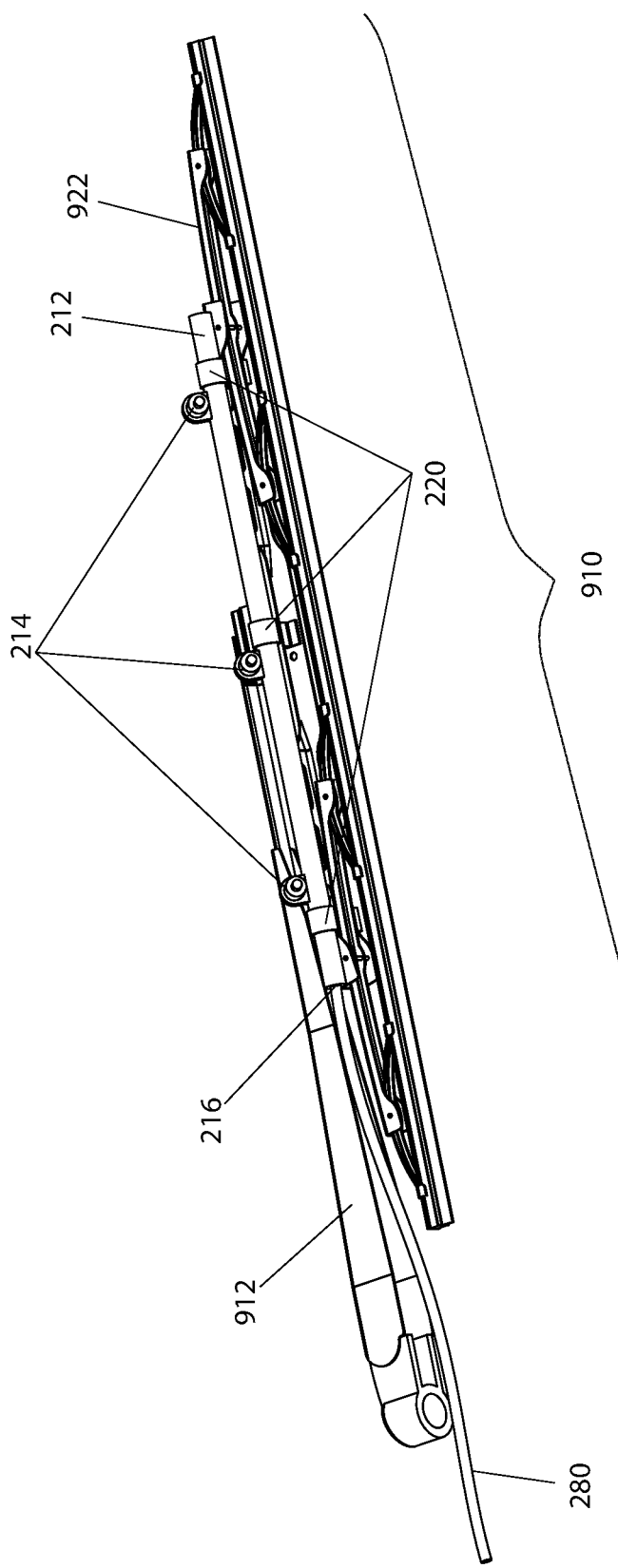
FIG. 2 is a detail view of a clip-on spray rig, according to an embodiment of the present invention.

Referring to FIG. 2, the individual windshield wiper 910 is shown in more detail. The manifold 212 may be coupled to the wiper superstructure 922 of the individual windshield wiper 910 via the plurality of clips 220. The tubing 280 may be routed adjacent to the wiper arm 912 couples to the manifold 212 via the spray coupler 216. The plurality of nozzles 214 may be positioned at the top of the manifold 212.

Figure 3A:
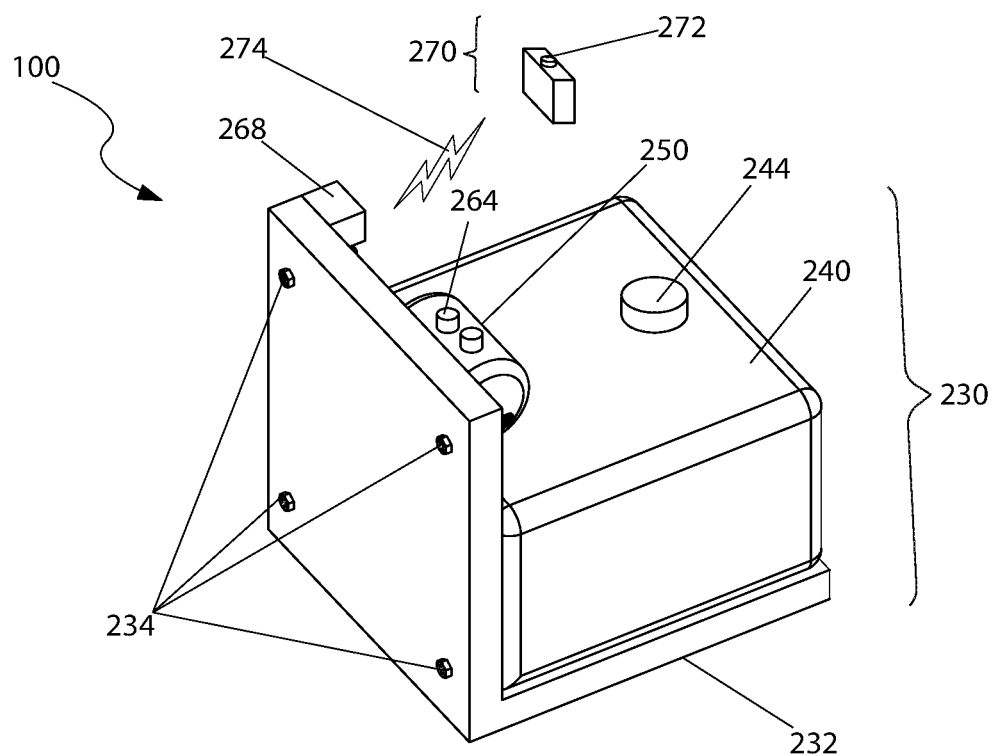
FIG. 3*a* is an isometric view of a clip-on spray rig, according to an embodiment of the present invention illustrating the fluid supply assembly.

Referring to FIG. 3a, the invention 100 may comprise the fluid supply assembly 230. The mounting bracket 232 may provide the two (2) or more mounting apertures 234 for mounting the mounting bracket 232. The fluid tank 240 may be coupled to the mounting bracket 232 and may be refilled by removing the cap 244. The motor pump assembly 250 may pump fluid from the fluid tank 240 out of the one (1) or more outlet couplers 264. The wireless receiver 268 may receive the wireless signal 274 from the wireless transmitter 270 when the pump control 272 is activated and upon receiving the wireless signal 274 the wireless transmitter 270 may energize the motor pump assembly 250.

Figure 3B:
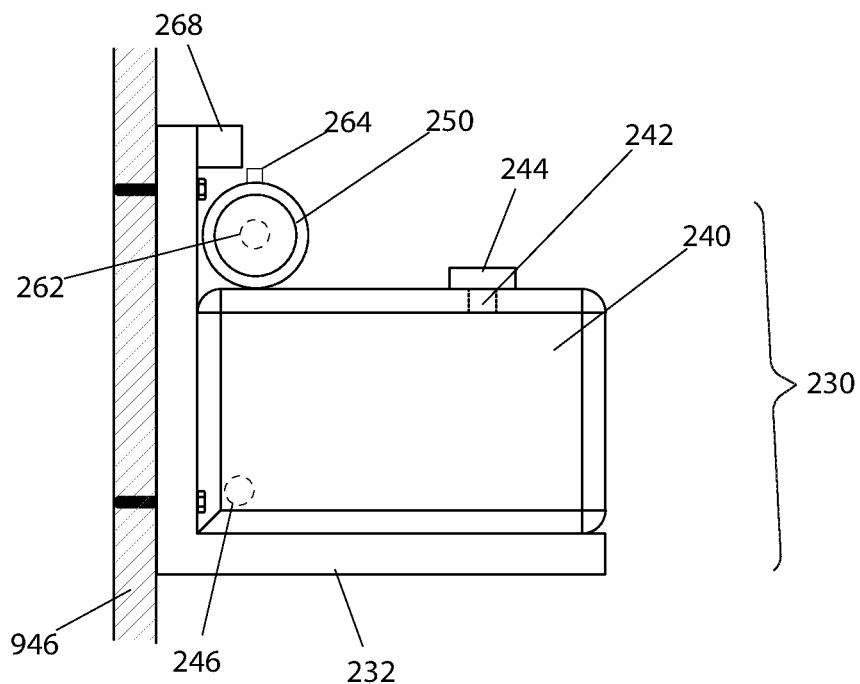
FIG. 3*b* is a side view of a clip-on spray rig, according to an embodiment of the present invention illustrating the fluid supply assembly.

Referring to FIG. 3b, a side view of the fluid supply assembly 230 is shown. The mounting bracket 232 may couple to the firewall 946 and may support the fluid tank 240, the motor pump assembly 250, and the wireless receiver 268. The fluid tank 240 may be refilled through the fill aperture 242 when the cap 244 is removed. Fluid may be drawn out of the fluid tank 240 via the drain coupler 246, into the intake coupler 262 of the motor pump assembly 250, and pumped out of the one (1) or more outlet couplers 264 of the motor pump assembly 250 when the motor pump assembly 250 is energized by the wireless receiver 268.

Figure 4:
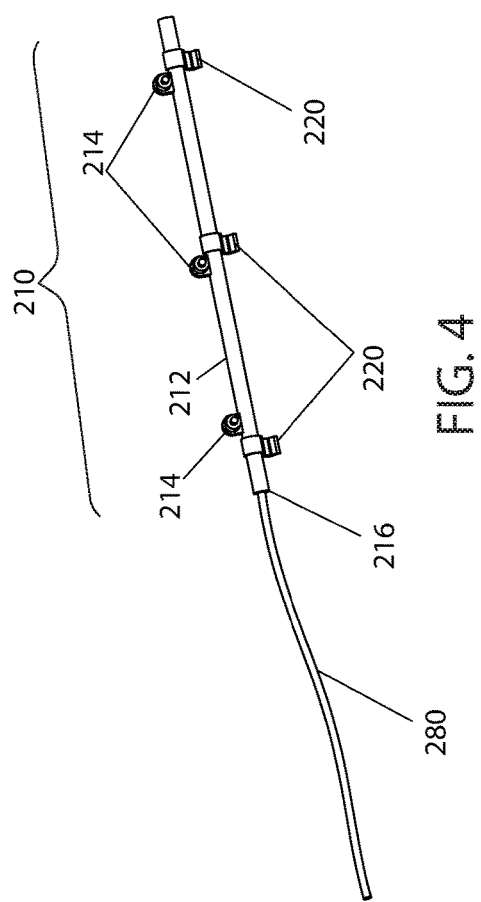
FIG. 4 is a detail view of a clip-on spray rig, according to an embodiment of the present invention illustrating an individual fluid sprayer; and, FIG. 5 is a detail view of a clip-on spray rig, according to an embodiment of the present invention illustrating an individual clip.

Referring to FIG. 4, the figure details the individual fluid sprayer 210. The manifold 212 may receive the fluid from the tubing 280 via the spray coupler 216 and may spray the fluid from the plurality of nozzles 214. The manifold 212 may couple to an individual windshield wiper via the plurality of clips 220.

Figure 5:
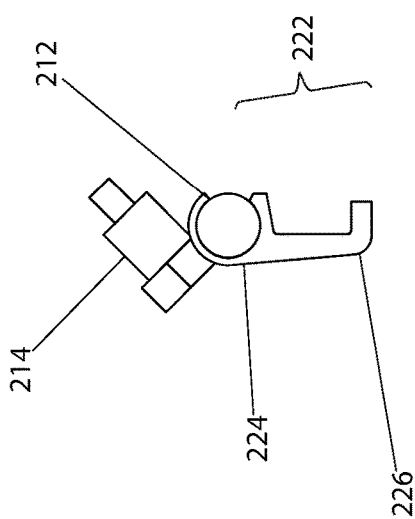

Referring to FIG. 5, shows the individual clip 222. The tube coupler 224 may grip the manifold 212 and may orient the manifold 212 to point the plurality of nozzles 214. The wiper coupler 226 may grip the individual windshield wiper such that the manifold 212 moves in unison with the wiper.

In use, the fluid supply assembly 230 may be mounted within the vehicle 930 and the individual fluid sprayer 210 may be coupled to the individual windshield wiper 910. As a non-limiting example, the fluid supply assembly 230 may be mounted under the hood of the vehicle 930 on the firewall 946. The tubing 280 may be routed from the individual outlet coupler on the motor pump assembly 250 of the fluid supply assembly 230 to the spray coupler 216 of the individual fluid sprayer 210. The fluid tank 240 on the fluid supply assembly 230 may be filled with the fluid 258. The wireless transmitter 270 may be placed inside the vehicle 930. The user may clean the windshield 934 by activating the pump control 272 on the wireless transmitter 270, thus causing the wireless transmitter 270 to transmit the wireless signal 274 to the wireless receiver 268 on the fluid supply assembly 230. For the duration of the wireless signal 274, the wireless transmitter 270 may energize the motor pump assembly 250 to pump the fluid 258 from the fluid tank 240 to the individual fluid sprayer 210. The fluid 258 may be sprayed onto the windshield 934 as the individual fluid sprayer 210 moves back and forth over the windshield 934 with the individual windshield wiper 910.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A clip-on spray rig, comprising:
one or more fluid sprayers detachably coupled to a pair of windshield wipers of a windshield of a vehicle, each of the one or more fluid sprayers include a manifold and a plurality of clips, the one or more fluid sprayers are supplied with a fluid pumped under pressure from the fluid supply assembly via a plurality of tubing;

a fluid supply assembly having a mounting bracket, a fluid tank, a motor pump assembly, and a wireless receiver, the fluid supply assembly is mounted under a hood of the vehicle and pumps the fluid out of the fluid tank through the tubing and to the one or more fluid sprayers when the pump within the fluid supply assembly is activated, the fluid tank includes a fill aperture and a drain coupler; and a wireless transmitter originates the wireless signal that is sent to the wireless receiver in order to pump the fluid, the wireless transmitter includes a pump control and the wireless transmitter transmit the wireless signal when the pump control is activated and cease transmitting the wireless signal when the pump control is deactivated;

wherein the manifold is a hollow tube that routes the fluid from a spray coupler to a plurality of nozzles;

wherein the manifold is coupled to a wiper superstructure of each of the windshield wipers via the clips;

wherein the clips detachably couple to the wiper superstructure of each of the windshield wipers;

wherein each of the clips include a tube coupler and a wiper coupler;

wherein when one of a plurality of outlet couplers is unused, the one of the outlet couplers is covered to prevent loss of the fluid from the one of the outlet couplers when not in use; and wherein the fluid from the fluid supply assembly is delivered through the one or more fluid sprayers at a higher pressure compared to the fluid pumped from a stationary nozzle of the windshield washer that is built into the vehicle.

2. The clip-on spray rig, according to claim 1, further comprising a pump within the fluid supply assembly is activated and the fluid is sprayed onto the windshield of the vehicle.

3. The clip-on spray rig, according to claim 2, wherein the pump is activated by a user from within the vehicle using the wireless transmitter.

4. The clip-on spray rig, according to claim 1, wherein the manifold is coupled to each of the windshield wipers such that the nozzles are oriented to point towards the windshield.

5. The clip-on spray rig, according to claim 1, wherein the clips are made of a semi-rigid material that flexes open to couple to the manifold and then spring close to retain a grip.

6. The clip-on spray rig, according to claim 1, wherein the tube coupler is a "C"-shaped armature located at a top end of each of the clips such that the tube coupler detachably couples to the manifold.

7. The clip-on spray rig, according to claim 1, wherein the tube coupler grips the manifold and orients the manifold to point the nozzles.

8. The clip-on spray rig, according to claim 1, wherein the fluid stored in the fluid tank of the fluid supply assembly is different from that of a windshield washer fluid reservoir of the vehicle.

9. The clip-on spray rig, according to claim 8, wherein the tubing couples the drain coupler to an intake coupler of the pump to transport the fluid from the fluid tank to the pump.

10. The clip-on spray rig, according to claim 1, wherein the fluid pumped from the fluid tank contains a solution selected from the group consisting of a deicer, a bug solvent, a detergent, or any combination thereof.

11. The clip-on spray rig, according to claim 1, wherein the mounting bracket is a base for holding the fluid tank, the pump and the wireless receiver and includes a plurality of mounting apertures for coupling the mounting bracket to the vehicle.

12. The clip-on spray rig, according to claim 1, wherein the motor pump assembly includes a motor and the pump within a single enclosure.

13. The clip-on spray rig, according to claim 1, wherein the wireless receiver energizes the motor in the motor pump assembly when the wireless receiver receives a wireless signal to deenergize the motor in the absence of the wireless signal.

14. The clip-on spray rig, according to claim 1, wherein the mounting bracket couples to a firewall and supports the fluid tank, the motor pump assembly, and the wireless receiver.

15. The clip-on spray rig, according to claim 1, wherein the fluid supply assembly is mounted within the vehicle and the individual fluid sprayer is coupled to the individual windshield wiper.

* * * * *